US007606566B2

(12) United States Patent
Ogoshi

(10) Patent No.: US 7,606,566 B2
(45) Date of Patent: Oct. 20, 2009

(54) MOBILE COMMUNICATION APPARATUS HAVING CAPABILITY OF HOUSING TEMPERATURE CONTROL

(75) Inventor: Isao Ogoshi, Tokyo (JP)

(73) Assignee: Kabsuhiki Kaisha Toshiba, Tokyo (JP)

( * ) Notice: Subject to any disclaimer, the term of this patent is extended or adjusted under 35 U.S.C. 154(b) by 674 days.

(21) Appl. No.: 11/384,901

(22) Filed: Mar. 20, 2006

(65) Prior Publication Data

US 2007/0173249 A1 Jul. 26, 2007

(30) Foreign Application Priority Data

Jan. 20, 2006 (JP) ............................ 2006-012673

(51) Int. Cl.
*H04W 24/00* (2006.01)
*H04N 5/232* (2006.01)

(52) U.S. Cl. .................. 455/423; 455/13.4; 455/127.1; 455/343.1; 455/425; 455/556.1; 348/211.11; 348/211.12; 348/208.16

(58) Field of Classification Search ................. 455/574, 455/343.1, 343.4, 343.5, 423, 425, 556.1, 455/550.1, 13.4, 127.1, 67.13
See application file for complete search history.

(56) References Cited

U.S. PATENT DOCUMENTS

2001/0044332 A1* 11/2001 Yamada et al. .............. 455/574
2002/0039897 A1* 4/2002 An .............................. 455/423
2003/0036365 A1* 2/2003 Kuroda ........................ 455/90
2005/0000958 A1* 1/2005 Stockley ..................... 219/486

FOREIGN PATENT DOCUMENTS

JP 2001-257912 A 9/2001
JP 2003-309473 A 10/2003

* cited by examiner

*Primary Examiner*—Huy Q Phan
(74) *Attorney, Agent, or Firm*—Frishauf, Holtz, Goodman & Chick, P.C.

(57) ABSTRACT

A mobile communication apparatus capable of controlling housing temperature is provided. The mobile communication apparatus includes a first and a second modules, an operating mode manager for managing a plurality of modes based on a combination of whether the first and the second modules each are supplied with power, and a memory for storing a plurality of data relating a period of operating time to a value of housing temperature for each of the modes. The communication apparatus includes a temperature estimator configured to measure the operating time, and if the mode is changed, to estimate a first and a second values of housing temperature corresponding to the operating time of the mode before the change and of the mode after the change respectively, and to have the operating mode manager stop the operation if an estimation based on the first and the second values reaches a predetermined threshold.

13 Claims, 5 Drawing Sheets

TEMP-TIME MEMORY 14

14a 14b 14c 14d 14e

| HOUSING TEMPE-RATURE | TIME (in Minutes) | | | |
|---|---|---|---|---|
| | FULL CAMERA (D1) | MAIN CAMERA ONLY (D2) | SUB CAMERA ONLY (D3) | STATIC PICTURE (D4) |
| ⋮ | | | | |
| 60 °C | 130 (P4) | 260 (P5) | 370 | INDEFINITE (SATURATED AT 45 °C) |
| ⋮ | | | | |
| 50 °C | 85 (P1) | 180 (P2) | 270 (P3) | INDEFINITE (SATURATED AT 45 °C) |
| ⋮ | | | | |
| 35 °C | 50 (P0) | 100 | 160 | 220 |
| ⋮ | | | | |
| 0 °C | 0 | 0 | 0 | 0 |

FIG. 3

MOBILE COMMUNICATION APPARATUS HAVING CAPABILITY OF HOUSING TEMPERATURE CONTROL

CROSS REFERENCE TO RELATED APPLICATIONS

This application is based upon and claims the benefit of priority from the prior Japanese Patent Application No. 2006-012673 filed on Jan. 20, 2006; the entire contents of which are incorporated herein by reference.

FIELD OF THE INVENTION

The present invention relates to a mobile communication apparatus having a capability of controlling housing temperature.

DESCRIPTION OF THE BACKGROUND

A mobile radio is known is disclosed in Japanese Patent Publication (Kokai), No. 2003-309473, which is configured to keep its housing temperature from rising. In the publication, a technique is shown for keeping housing temperature from rising in the above publication, by limiting a period of time of consecutive transmission to a value t1 and banning the transmission for a certain period of time after the housing temperature reaches t1.

As shown in "Embodiment of the Invention" of the above publication, the mobile radio has a temperature sensor, and sets its transmitter power to a normal value before t1 and reduces the power after t1 if the temperature is no higher than a threshold. The mobile radio bans the transmission if the temperature exceeds the threshold. By this operation, the mobile radio may reduce a period of time while the transmission is banned and may improve capability of emergency calls.

An image photographing device is disclosed in Japanese Patent Publication (Kokai), No. 2001-257912, which is configured to extend battery endurance by saving power. According to the publication, the image photographing device may save power by reducing a number of pixels per a frame and by reducing a frame rate.

Owing to a trend of multi-functioning and downsizing in recent years, a mobile communication apparatus, e.g., a mobile phone, often suffers from thermal problems. One of the problems is a time limitation of a TV call during which a plurality of heat dissipating devices like a main camera, a sub camera and a radio amplifier works together to dissipate lots of heat.

The technique of the transmission time limitation described above has a problem that the period of time of consecutive transmission is limited to the value t1 and may not be extended over t1. The mobile radio described above has a problem that the temperature sensor is required and that a transmission performance may be degraded due to the power reduction after t1.

The image photographing device described above may contribute to power saving, but an effect to its temperature is unknown. In general, reducing the number of pixels or the frame rate may contribute to power saving, but may not be counted on to alleviate thermal problems.

SUMMARY OF THE INVENTION

Accordingly, an advantage of the present invention is that a mobile communication apparatus having no temperature sensor may control a relation between a period of time of operation and housing temperature.

To achieve the above advantage, one aspect of the present invention is to provide a mobile communication apparatus having and being configured in a housing. The mobile communication apparatus includes a first module, a second module, a first power controller configured to turn on and to turn off power supplied to the first module, and a second power controller configured to turn on and to turn off power supplied to the second module. The mobile communication apparatus includes an operating mode manager configured to manage an operation of a mode selected out of a plurality of modes including a first mode and a second mode, where each of the modes is a combination of whether the first power controller turns on power supplied to the first module and whether the second power controller turns on power supplied to the second module, and includes a memory configured to store a plurality of data of each of the modes regarding a relation between a period of time of operation and a value of housing temperature. The mobile communication apparatus includes a temperature estimator configured to measure a period of time of operation of the selected mode. If the selected mode is changed from the first mode to the second mode, the temperature estimator may to estimate a first value of housing temperature corresponding to the period of time of operation of the first mode based on the data of the first mode read out of the memory, and may estimate a second value of housing temperature corresponding to the period of time of operation of the second mode based on the data of the second mode read out of the memory. The temperature estimator is configured to have the operating mode manager stop the operation of the selected mode if an estimation based on the first value and the second value reaches a predetermined threshold.

BRIEF DESCRIPTION OF THE DRAWINGS

FIG. 3 shows a table illustrating a relation between the housing temperature and the operating time for each operating mode of the mobile communication apparatus shown in FIG. 1.

DETAILED DESCRIPTION OF THE INVENTION

Figure 1:
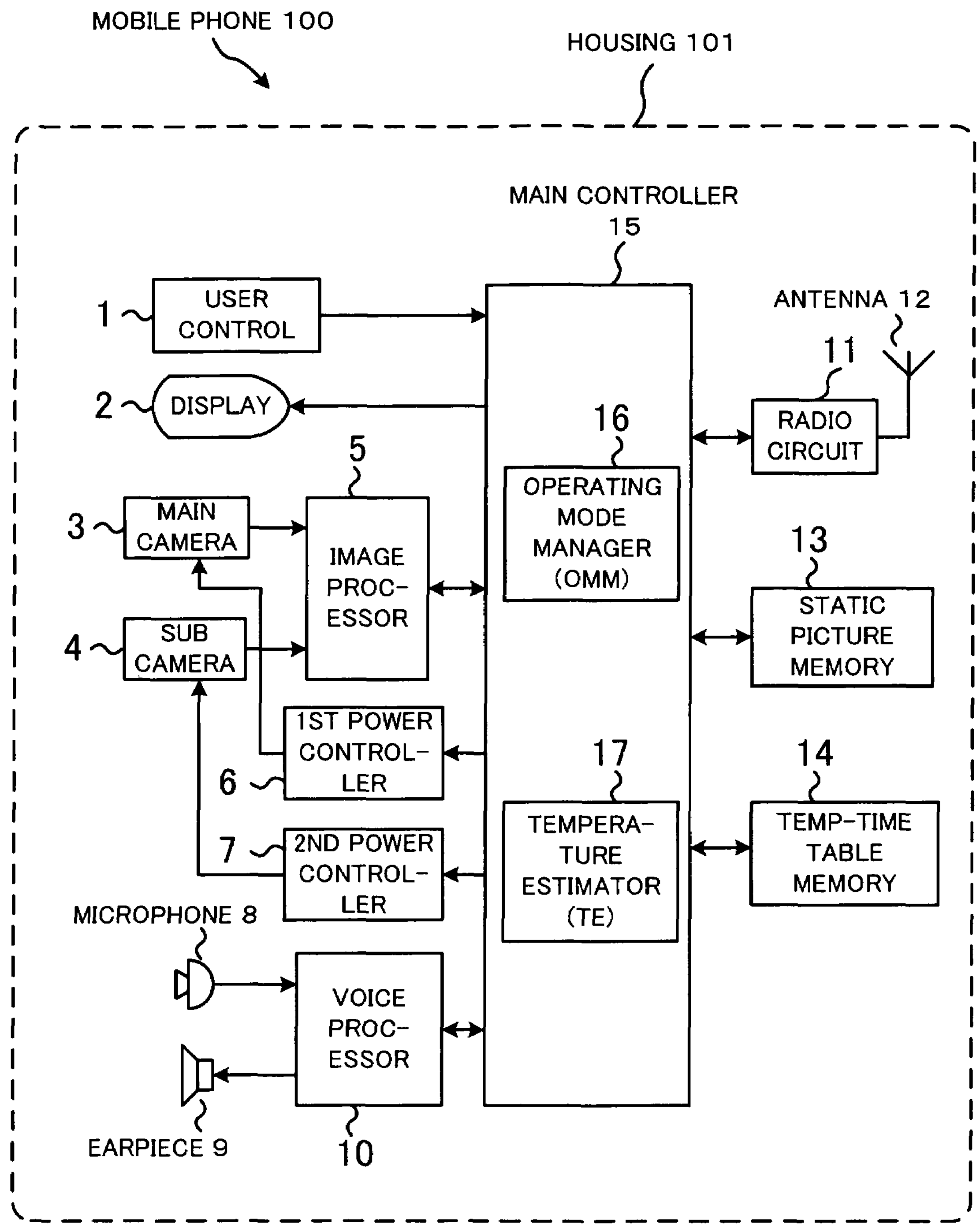
FIG. 1 is a block diagram of a mobile communication apparatus of an embodiment of the present invention.

An embodiment of the present invention will be described with reference to FIGS. 1-5. FIG. 1 is a block diagram of a mobile phone 100, i.e., a mobile communication apparatus according to the embodiment of the present invention. The mobile phone 100 has a housing 101 drawn by a dashed line and is configured in the housing 101. The housing 101 may be formed by a case. The housing 101 may be formed by a plurality of cases which are movably connected one another.

The mobile phone 100 has a set of user controls 1 (hereinafter called the user control 1), a display 2, a main camera 3, a sub camera 4, an image processor 5, a first power controller 6 serving the main camera 3, a second power controller 7 serving the sub camera 4, a microphone 8, an earpiece 9, a voice processor 10, a radio circuit 11, an antenna 12, a static picture memory 13 (hereinafter called the picture memory 13), a temperature-time table memory 14 (hereinafter called the temp-time memory 14), a main controller 15 and so forth. The main controller 15 includes an operating mode manager 16 (hereinafter called the OMM 16), a temperature estimator 17 (hereinafter called the TE 17) and so forth.

The user control 1 includes a plurality of keys and may be operated by a user of the mobile phone 100. The display 2 is formed by, e.g., a liquid crystal device and may present to the user pieces of information formed by images and text. The main camera 3 may take a moving picture of high resolution. The sub camera 4 may take a moving picture of lower resolution. The main camera 3 and the sub camera 4 may take a static picture, respectively. The main camera 3 may be a big factor of heating the mobile phone 100 by dissipating a certain amount of heat, and the sub camera 4 may be as well.

The image processor 5 may deal with compression and extraction of an image obtained by one of the main camera 3 and the sub camera 4. The first power controller 5 may work as a switch to turn on and to turn off power supplied to the main camera 3. The second power controller 6 may work as a switch to turn on and to turn off power supplied to the sub camera 4. The microphone 8 may pick up a voice of the user. The earpiece 9 may provide the user with a received voice and an alarm sound. The voice processor 10 may deal with compression of the voice picked up by the microphone 8, and extraction of the received voice and the alarm sound to drive the earpiece 9.

The radio circuit 11 and the antenna 12 may send and receive a plurality of radio signals to and from a base station (not shown) on an assigned frequency band. The radio circuit 11 may be a big factor of heating the mobile phone 100 by dissipating a certain amount of heat.

The picture memory 13 may store a set of data of a picture taken by one of the main camera 3 and the sub camera 4. The picture memory 13 may store a set of data of a picture obtained from the Internet via the antenna 12 and the radio circuit 11. The picture memory 13 may store a set of data of a picture attached to an e-mail received via the antenna 12 and the radio circuit 11. The temp-time memory 14 may store a plurality of data regarding a relation between a value of housing temperature and a period of time of operation (hereinafter called the operating time) obtained by a simulation, an experiment and so forth in a design and development phase of the mobile phone 100.

The main controller 15 may entirely monitor and control the mobile phone 100. The OMM 16 included in the main controller 15 may deal with a TV call, in which the picture taken by the main camera 3, the picture taken by the sub camera 4, the picture stored in the picture memory 13, the voice picked up by the microphone 8 and the voice driving the earpiece 9 are sent and received, respectively. The OMM 16 may control the first power controller 6 and the second power controller 7, and may manage an operation of a mode that is a combination of a state of power of the main camera 3 and a state of power of the sub camera 4.

The TE 17 included in the main controller 15 may select an operating mode, and may measure a period of time of the operating mode, i.e., may count the operating time, e.g., in minutes. The TE 17 may estimate a value of housing temperature of the mobile phone 100 with reference to the data stored in the temp-time memory 14. The TE 17 may estimate a period of time remaining before the estimated housing temperature reaches a predetermined threshold, and may present the estimated remaining time on the display 2. The mobile phone 100 is able to estimate the housing temperature although having no temperature sensor to detect an actual value of the housing temperature.

Figure 2:
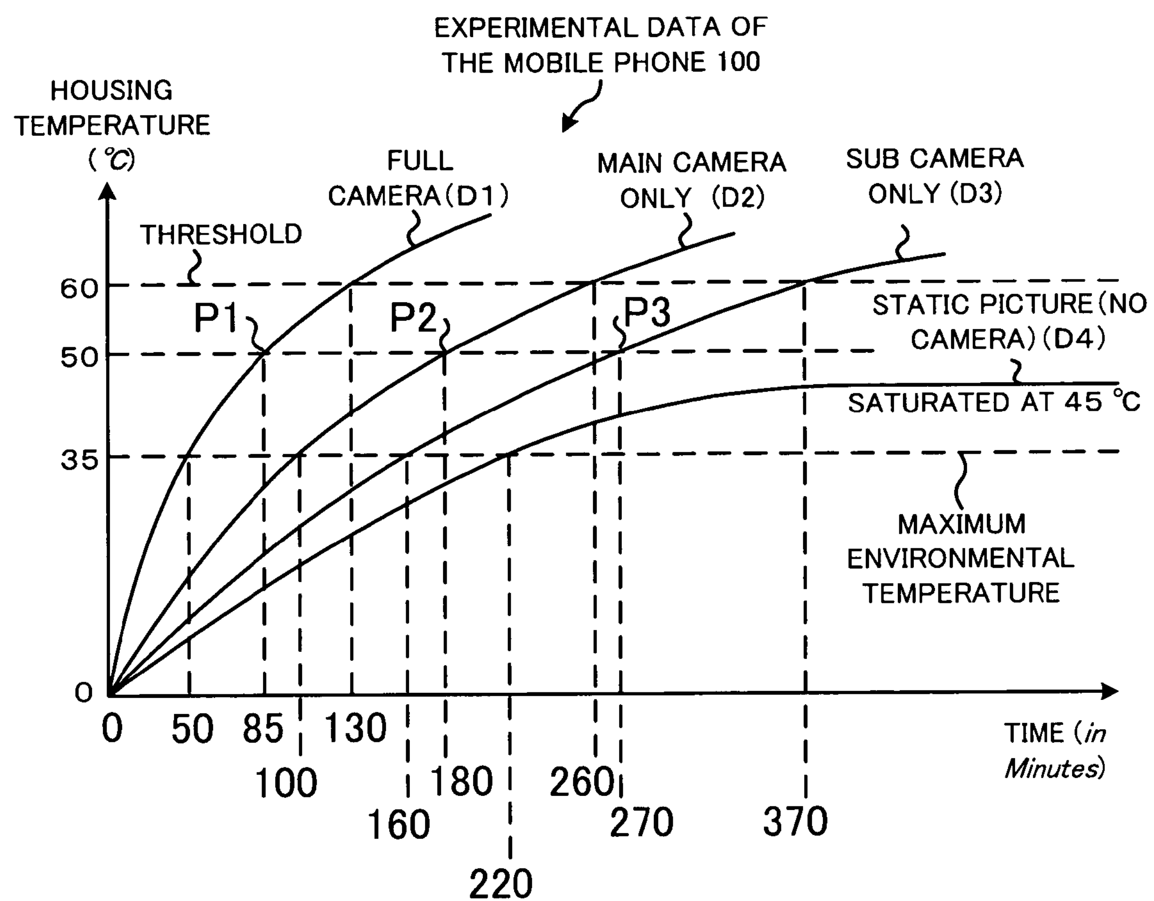
FIG. 2 shows a graph of a relation between housing temperature and a period of time of operation of the mobile communication apparatus shown in FIG. 1.

FIG. 2 shows a graph of a relation between the housing temperature and the operating time obtained by an experiment in a design and development phase of the mobile phone 100. There is shown a time-dependent variation of the housing temperature experimentally detected by a temperature sensor attached to a surface of the housing 101.

The graph is drawn on a plane defined by a horizontal time axis and a vertical temperature axis. On the vertical axis, shown is a plurality of values of the housing temperature that may be directly felt by the user of the mobile phone 100. The predetermined threshold may be set, e.g., to 60 degrees centigrade (denoted by "60° C. " in FIG. 2) that the user may feel hot. A guaranteed value of maximum environmental temperature of the mobile phone 100 is assumed to be 35 degrees centigrade. The graph shows a set of experimental data of the housing temperature variation in a case where the mobile phone 100 is placed in an environment of zero degrees centigrade and is consecutively operated for a TV call. The graph includes four plotted curves, and each of the curves corresponds to one of the modes that is a combination of whether the first power controller 6 turns on power supplied to the main camera 3 and whether the second power controller 7 turns on power supplied to the sub camera 4.

The heat sources like the main camera 3, the sub camera 4 and the radio circuit 11 simultaneously work in a TV call operation, and thereby heat the mobile phone 100 more than in other kinds of operations. The housing temperature may exceed the predetermined threshold, 60 degrees centigrade, in a consecutive TV call operation.

A TV call is an operation of sending and receiving voices and images between two parties of the call. As described above, there are a plurality of modes each of which is a combination of whether the first power controller 6 turns on power supplied to the main camera 3 and whether the second power controller 7 turns on power supplied to the sub camera 4. They are a full camera mode (denoted by "D1" in FIG. 2), a main camera only mode (denoted by "D2" in FIG. 2), a sub camera only mode (denoted by "D3" in FIG. 2) and a static picture mode (denoted by "D4" in FIG. 2).

In the full camera mode D1, the power is supplied to both the main camera 3 and the sub camera 4. In the static picture mode D4, the power is supplied neither to the main camera 3 nor to the sub camera 4, and the picture stored in the picture memory 13 may be sent. These modes may be either manually or automatically changed one another.

In the full camera mode D1, a mixture of a background moving picture taken by the main camera 3 and a moving picture taken by the sub camera 4, a self-portrait, is sent to the other party of the TV call. In the main camera only mode D2, a moving picture taken by the main camera 3 is sent to the other party of the TV call. In the sub camera only mode D3, a moving picture taken by the sub camera 4 is sent to the other party of the TV call. In the static picture mode D4, a static picture stored in the picture memory 13 is sent to the other party of the TV call.

In the full camera mode D1 that shows greatest heat dissipation in FIG. 2, the housing temperature reaches 35 degrees centigrade in 50 minutes after starting an operation, 50 degrees centigrade in 85 minutes (denoted by "P1" in FIG. 2), 60 degrees centigrade in 130 minutes, and further continues rising. In the main camera only mode D2, the housing temperature reaches 35 degrees centigrade in 100 minutes after starting the operation, 50 degrees centigrade in 180 minutes (denoted by "P2" in FIG. 2), 60 degrees centigrade in 260 minutes, and further continues rising.

In the sub camera only mode D3, the housing temperature reaches 35 degrees centigrade in 160 minutes after starting the operation, 50 degrees centigrade in 270 minutes (denoted by "P3" in FIG. 2), 60 degrees centigrade in 370 minutes, and further continues rising. In the static picture mode D4, the housing temperature reaches 35 degrees centigrade in 220 minutes after starting the operation, and is saturated at 45 degrees centigrade.

The graph in FIG. 2 shows a set of experimental data of the housing temperature variation in a case where the mobile phone 100 is placed in an environment of zero degrees centigrade and is consecutively operated. In a case where the mobile phone 100 is placed in an environment of 35 degrees centigrade and is consecutively operated, a part of the graph above 35 degrees centigrade may thereby be a bit different from that of FIG. 2. An error produced by the above difference, however, is generally small enough that the part above 35 degrees centigrade in FIG. 2 may be applied to the case where the mobile phone 100 is placed in an environment of 35 degrees centigrade for a purpose of controlling the housing temperature below the predetermined threshold, 60 degrees centigrade.

Another set of experimental data of the housing temperature variation may be obtained in the case where the mobile phone 100 is placed in an environment of 35 degrees centigrade and is consecutively operated, and may be used as a base of the control of the housing temperature.

FIG. 3 shows a table equivalent to the graph shown in FIG. 2, illustrating a relation between the housing temperature and the operating time for each of the modes. The relation may be obtained by an experiment, a simulation and so forth in a design and development phase of the mobile phone 100. The experimental data in the development phase may be stored in the temp-time table memory 14 of a product of the mobile phone 100. The table, although showing a typical part of the data in FIG. 3, may include the data in a more detailed form like minute by minute, degree by degree, and so forth.

In a column of the housing temperature 14*a*, stored are the data of the housing temperature like zero, 35, 50 and 60 degrees centigrade. In a column of the full camera mode D1, 14*b*, stored are the data of the operating time like zero, 50, 85 ("P1") and 130 minutes, each of which indicates the operating time corresponding to each of the housing temperature values shown in the column of the housing temperature 14*a*.

In a column of the main camera only mode D2, 14*c*, a column of the sub camera only mode D3, 14*d* and a column of the static picture mode D4, 14*e*, similarly and respectively stored are the data of the operating time each of which indicates the operating time corresponding to each of the housing temperature values shown in the column of the housing temperature 14*a*.

Figure 4:
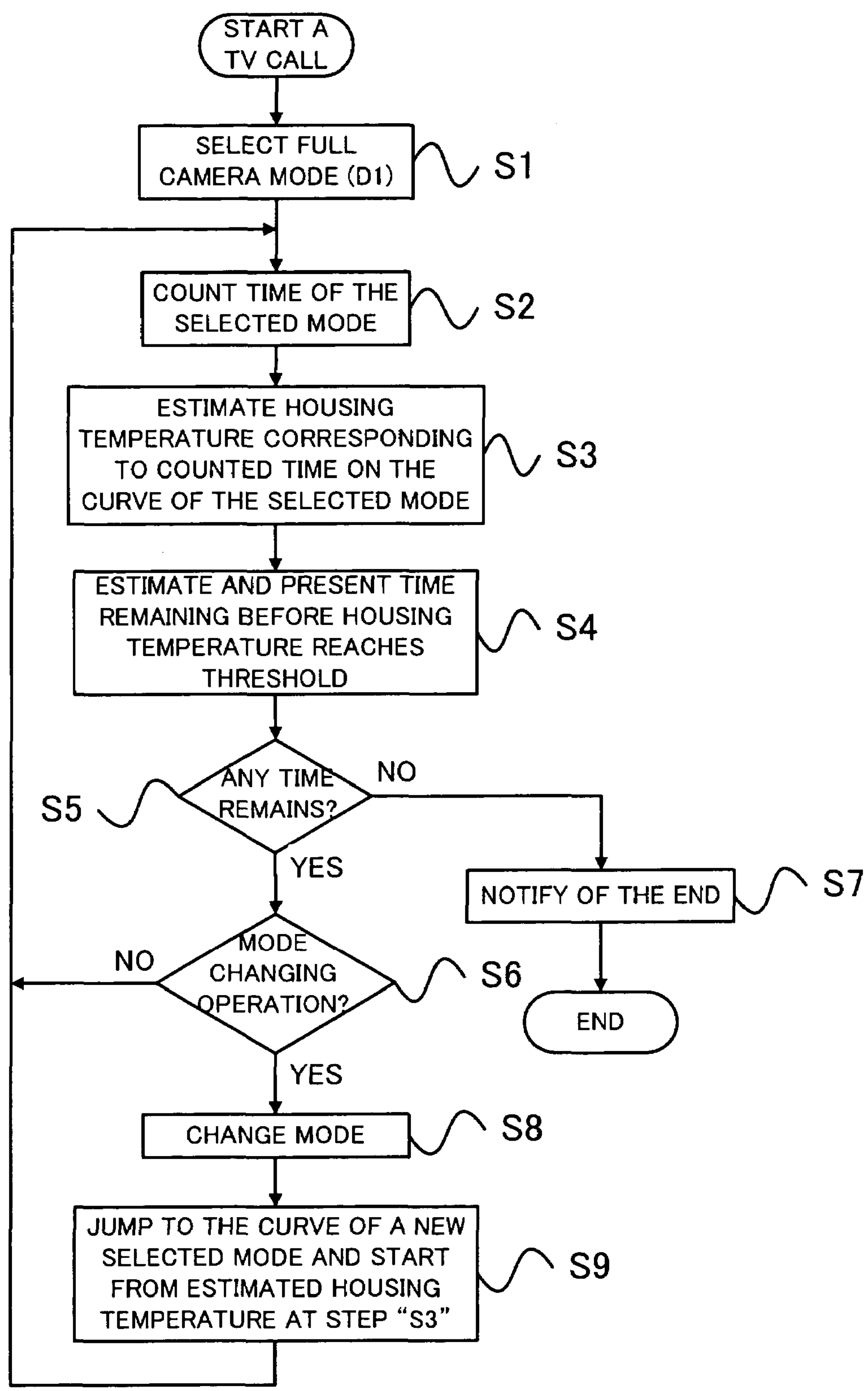
FIG. 4 is a flow chart of an operation process according to the embodiment of the present invention.
Figure 5:
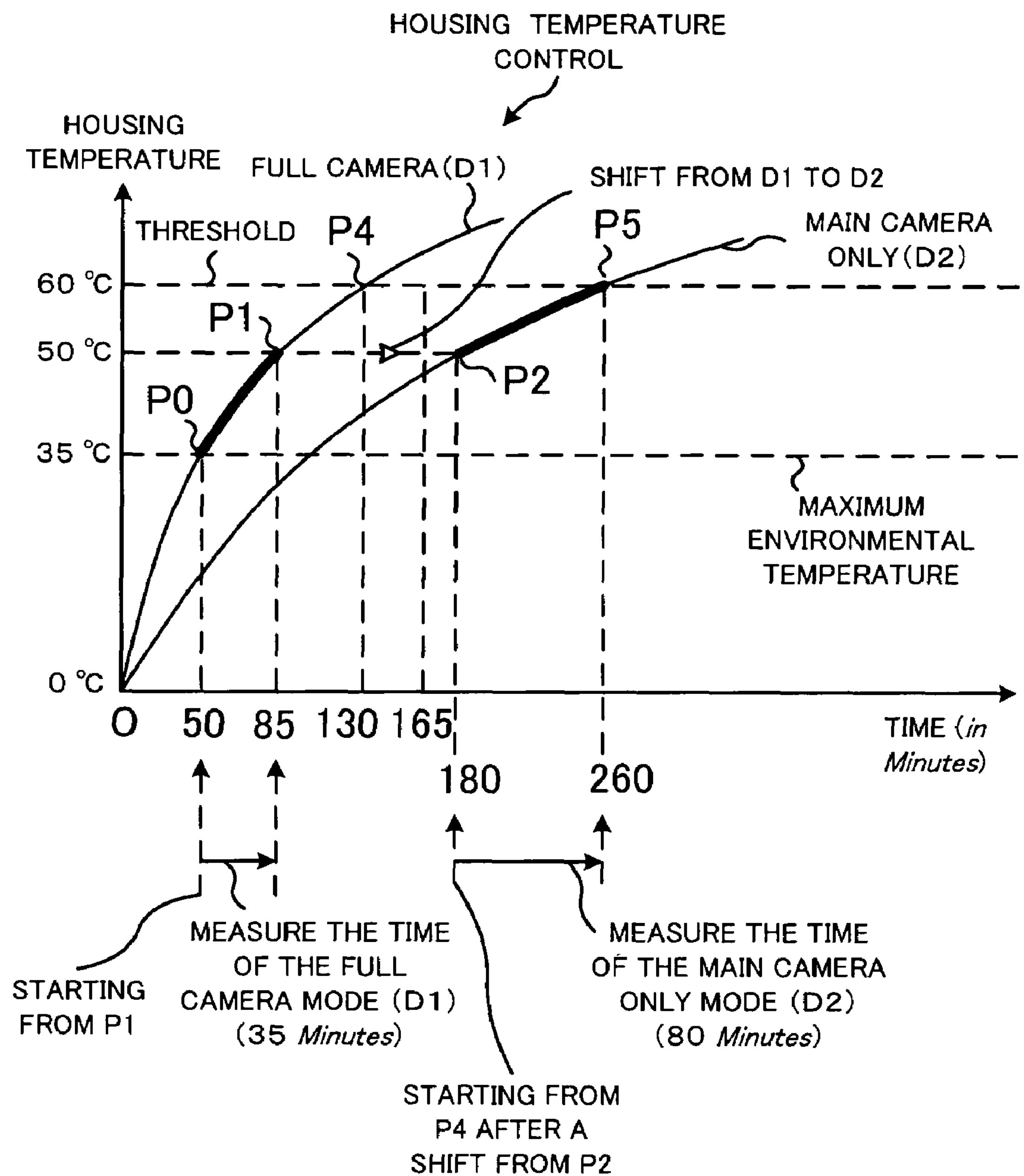
FIG. 5 illustrates a way of estimating the housing temperature of the mobile communication apparatus shown in FIG. 1.

FIG. 4 is a flow chart of processing to estimate the housing temperature of the mobile phone 100 managed by the main controller 15. FIG. 5 includes two plotted curves each of which is a same as the corresponding one denoted by "D1" and "D2", respectively, and illustrates a way of estimating the housing temperature of the mobile phone 100 managed by the main controller 15.

The graph in FIG. 5 is equivalent to the relation between the column of the housing temperature 14*a* and the column of the full camera mode D1, 14*b*, and to the relation between the column of the housing temperature 14*a* and the column of the main camera only mode D2, 14*c*. The main controller 15 may estimate the housing temperature based on the data stored in the temp-time table memory 14 as shown in FIG. 3, and its processing flow will be described with reference to FIG. 4, and to the graph in FIG. 5 equivalent to the table in FIG. 3.

The main controller 15 selects one of the modes as a first operating mode after staring a TV call (step "S1"). Assume, e.g., that the full camera mode D1 is selected as the first operating mode. The main controller 15 starts an operation of the full camera mode D1 and counts the operating time (step "S2"). The main controller 15 associates the counted operating time with a value of the housing temperature on the curve of the full camera mode D1 starting from the point "P1" (50 minutes, 35 degrees centigrade), as shown by an overlaid bold line in FIG. 5.

Being informed of no exact value of the environmental temperature as the mobile phone 100 has no temperature sensor, the main controller 15 estimates the housing temperature based on an assumption that the present value of the environmental temperature equals to the guaranteed maximum value. The above assumption corresponds to a worst case scenario that the housing temperature reaches the predetermined threshold that the user may feel hot, 60 degrees centigrade, in a shortest period of time.

The main controller 15 estimates the housing temperature of the mobile phone 100 in use by tracing the curve of the full camera mode D1 and detecting a temperature value on the vertical axis corresponding to the counted operating time. If the counted operating time is zero, the main controller 15 estimates the housing temperature of the mobile phone 100 in use to be 35 degrees centigrade based on time and temperature values of a point "P0" (step "S3").

The main controller 15 presents on the display 2 a period of time, 80 minutes, remaining before reaching a point "P4" (130 minutes, 60 degrees centigrade that the user may feel hot) that is a time difference between the point "P0" (50 minutes) and the point "P4" (130 minutes) in a case where the full camera mode D1 continues (step "S4").

If the above remaining time is greater than zero ("YES" of step "S5"), the main controller 15 estimates the housing temperature to be lower than 60 degrees centigrade. The main controller 15 finds out whether the user control 1 is operated so that the operating mode is changed (step "S6"). If there is no change of the operating mode ("NO" of step "S6"), the main controller 15 goes back to the step "S2" to repeat the steps "S2"-"S6". While repeating the above steps "S2"-"S6", the main controller 15 estimates the housing temperature corresponding to the counted operating time by tracing the bold line on the curve of the full camera mode D1 as described above.

If the counted operating time is 35 minutes, the main controller 15 estimates the housing temperature of the mobile phone 100 in use to be 50 degrees centigrade based on the time and temperature values of the point "P1" (85 minutes, 50 degrees centigrade) (step "S3"). The main controller 15 presents on the display 2 a period of time, 45 minutes, remaining before reaching the point "P4" (60 degrees centigrade) that is a time difference between the point "P1" (85 minutes) and the point "P4" (130 minutes).

If the full camera mode D1 continues without being changed to the other modes and the operating time is counted up to 80 minutes at the point "P4", the main controller 15 determines that no time remains before reaching the point "P4" ("NO" of step "S5"), reports an end of the TV call (step "S7") and ends the flow of processing.

If the presented remaining time is considered insufficient, the operating mode may be changed to the main camera only mode D2 by a user's operation while the steps "S2"-"S6" are being repeated. After the above user's operation (step "S6"), the main controller 15 changes the operating mode to the main camera only mode D2 (step "S8").

If the operating mode is changed at the operating time of 35 minutes, the main controller 15 stops tracing the curve of the full camera mode D1 at the point "P1", and jumps to the point "P2" of a same value as the temperature value of the point "P1", 50 degrees centigrade (step "S9"), to start tracing the curve of the main camera only mode D2.

The main controller 15 then goes back to the step "S2", and starts counting the operating time of the newly started main camera only mode D2 from zero minutes. The main controller 15 associates the counted operating time with a value of the housing temperature on the curve of the main camera only mode D2 starting from the point "P2" (180 minutes, 50 degrees centigrade), as shown by another overlaid bold line in FIG. 5. The main controller 15 estimates the housing temperature, and presents on the display 2 a period of time remaining before the housing temperature reaches the predetermined threshold, while the steps "S2"-"S6" are being repeated.

If, e.g., the counted operating time is zero, the main controller 15 estimates the housing temperature of the mobile phone 100 in use to be 50 degrees centigrade based on the time and temperature values of the point "P2" (step "S3"). The main controller 15 presents on the display 2 a period of time, 80 minutes, remaining before reaching a point "P5" (260 minutes, 60 degrees centigrade that the user may feel hot) that is a time difference between the point "P2" (180 minutes) and the point "P5" (260 minutes) in a case where the main camera only mode D2 continues (step "S4").

If the counted operating time of the main camera only mode D2 is 80 minutes, the main controller 15 estimates the housing temperature of the mobile phone 100 in use to be 60 degrees centigrade based on the time and temperature values of the point "P5" (260 minutes, 60 degrees centigrade) (step "S3"). The main controller 15 presents on the display 2 the remaining time, zero minutes, before reaching the point "P5" (260 minutes, 60 degrees centigrade that the user may feel hot) that is a time difference between the point "P5" (260 minutes) and the point "P5" (260 minutes) in a case where the main camera only mode D2 continues (step "S4"). The main controller 15 determines that no time remains before reaching the point "P5" ("NO" of step "S5"), reports an end of the TV call (step "S7") and ends the flow of processing.

If the full camera mode ("D1") continues from the point "P0" to the point "P4", the operating time is counted up to 80 minutes. If the operating mode is changed at the point "p1", the operating time is determine by a total length on the time axis of the two bolded lines shown in FIG. 5, 115 minutes, that is extended as the curve becomes gentler halfway.

If the operating mode is changed to the sub camera only mode D3 by a user's operation while the steps "S2"-"S6" are being repeated, the main controller 15 may similarly estimate the housing temperature corresponding to the counted operating time by tracing the curve of the sub camera only mode D3. If the operating mode is changed to the static picture mode D4, the housing temperature is saturated at 45 degrees centigrade lower than the predetermined threshold, 60 degrees centigrade, and a period of time before the housing temperature reaches the predetermined threshold is indefinite.

If the operating mode is changed to the static picture mode D4 while the housing temperature exceeds 45 degrees centigrade, the main controller 15 may similarly estimate a decline of the housing temperature based on a stored data table obtained by an experiment in advance.

The main controller 15 may automatically change the operating mode from the full camera mode D1 to one of the other modes of lower heat dissipation, e.g., the main camera only mode D2 after checking that the housing temperature reaches a preset mode changing temperature (an estimated value). The main controller 15 may automatically change the operating mode from the full camera mode D1 to one of the other modes of lower heat dissipation, e.g., the main camera only mode D2 after checking that the operating time is counted up to a preset mode changing time.

If the above mode changing temperature is preset to the estimated value of 50 degrees centigrade and the mode is changed at the point "P2" on the curve of the full camera mode D1 in FIG. 5, the main controller 15 may set the starting point ("P2" in FIG. 5) according to the estimated value of 50 degrees centigrade, i.e., may count the housing temperature in degrees starting from 50 degrees afterwards in the main camera only mode D2.

If the above mode changing time is preset to 85 minutes and the mode is changed at the point "P2" on the curve of the full camera mode D1 in FIG. 5, the main controller 15 may set the starting point ("P2" in FIG. 5) according to the time 180 minutes, i.e., may count the operating time starting from 180 minutes afterwards in the main camera only mode D2.

The main controller 15 may present on the display 2 which mode is operating, and may report to the user that the operating mode has been changed.

In the above description, the main controller 15 turns on and turns off power supplied to at least one of the main camera 3 and the sub camera 4 to decrease heat dissipation. If at least one of the main camera 3 and the sub camera 4 has a specific function to decrease lots of heat dissipation like a stand-by mode, a sleep mode and so on, the main controller 15 may directly control the above specific function.

The present invention may be applied to an apparatus without a temperature sensor and operating in a plurality of modes of various heat dissipation as well as to a mobile phone and to a TV call, similarly enabling the apparatus to extend a limited period of operating time by changing the operating modes.

In the above description, the data of the relation between the housing temperature and the operating time is experimentally obtained and stored in the temp-time memory 14. The data may be approximated by a linear function, by a simple analytic function and so on in the time-temperature plane as shown in FIG. 2 and FIG. 5, while each of the modes other than the full camera mode D1 is defined by a curve gentler than the curve of the full camera mode D1. In such a case, the vertical axis may be defined not by an absolute value but by a relative value of the housing temperature.

In the above description, the main controller 15 stops tracing the curve of the full camera mode D1 at the point "P1", jumps to the point "P2" and starts tracing the curve of the main camera only mode D2 from the point "P2". In a case where there is some residual heat to be considered after turning off power of the full camera mode D1, however, the main controller 15 may jump from a point of a bit higher temperature value on the curve of the full camera mode D1 to a point of a same temperature value on the curve of the main camera only mode D2, as well as in a case where there is a time lag, a difference of the value and so on between the heat source temperature and the housing temperature to be considered. It is basically true in a case where the above jump is made from a point on the curve of the full camera mode D1 to a point of a same temperature value on the curve of the sub camera only mode D3.

According to the embodiment of the present invention described above, the mobile phone 100 having no temperature sensor and with a memory storing the data, obtained in the development phase, of the relation between the housing temperature and the operating time may estimate the housing temperature and may extend a limited period of operating time by changing the operating modes after shipment.

The particular hardware or software implementation of the present invention may be varied while still remaining within the scope of the present invention. It is therefore to be understood that within the scope of the appended claims and their equivalents, the invention may be practiced otherwise than as specifically described herein.

What is claimed is:

1. A mobile communication apparatus having and being configured in a housing, comprising:

a first module;

a second module;

a first power controller configured to turn on and to turn off power supplied to the first module;

a second power controller configured to turn on and to turn off power supplied to the second module;

an operating mode manager coupled to the first power controller and the second power controller, the operating mode manager being configured to manage an operation of a mode selected out of a plurality of modes including a first mode and a second mode, each of the modes being a combination of whether the first power controller turns on power supplied to the first module and whether the second power controller turns on power supplied to the second module;

a memory configured to store a plurality of data of each of the modes regarding a relation between a period of time of operation and a value of housing temperature; and a temperature estimator coupled to the operating mode manager and the memory, the temperature estimator being configured to measure a period of time of operation of the selected mode, and if the selected mode is changed from the first mode to the second mode, to estimate a first value of housing temperature corresponding to the period of time of operation of the first mode based on the data of the first mode read out of the memory, to estimate a second value of housing temperature corresponding to the period of time of operation of the second mode based on the data of the second mode read out of the memory, and to have the operating mode manager stop the operation of the selected mode if an estimation based on the first value and the second value reaches a predetermined threshold.

2. The mobile communication apparatus of claim 1 further comprising a radio circuit configured to send and receive a plurality of signals for a TV call, wherein the operating mode manager is configured to manage the operation of the selected mode during the TV call.

3. The mobile communication apparatus of claim 1 further comprising a set of user controls, wherein the operating mode manager is configured to change the selected mode according to an operation of the set of user controls.

4. The mobile communication apparatus of claim 1, wherein the temperature estimator is configured to have the operating mode manager change the selected mode from the first mode to the second mode if the estimation reaches a predetermined mode-changing value lower than the threshold.

5. A mobile communication apparatus having and being configured in a housing, comprising:

a first module;

a second module;

a first power controller configured to turn on and to turn off power supplied to the first module;

a second power controller configured to turn on and to turn off power supplied to the second module;

an operating mode manager coupled to the first power controller and the second power controller, the operating mode manager being configured to manage an operation of a mode selected out of a plurality of modes including a first mode and a second mode, each of the modes being a combination of whether the first power controller turns on power supplied to the first module and whether the second power controller turns on power supplied to the second module; a memory configured to store a plurality of data of each of the modes regarding a relation between a period of time of operation and a value of housing temperature; and a temperature estimator coupled to the operating mode manager and the memory, the temperature estimator being configured to measure a period of time of operation of the selected mode, and if the selected mode is changed from the first mode to the second mode, to estimate a first value of housing temperature corresponding to the period of time of operation of the first mode based on the data of the first mode read out of the memory, to estimate a second value of housing temperature corresponding to the estimated first value and the period of time of operation of the second mode read out of the memory, and to have the operating mode manager stop the operation of the selected mode if one of the first value and the second value reaches a predetermined threshold.

6. The mobile communication apparatus of claim 5, wherein the relation between a period of time of operation and a value of housing temperature may be plotted as a curve on a plane formed by a time axis and a temperature axis, and the temperature estimator is configured to estimate the second value by tracing the plotted curve of the second mode from a point having the first value on the temperature axis.

7. The mobile communication apparatus of claim 5, wherein the relation between a period of time of operation and a value of housing temperature may be plotted as a curve on a plane formed by a time axis and a temperature axis, and the temperature estimator is configured to estimate the second value by tracing the plotted curve of the second mode from a point having a value of time on the time axis corresponding to the first value.

8. The mobile communication apparatus of claim 5 further comprising a radio circuit configured to send and receive a plurality of signals for a TV call, wherein the operating mode manager is configured to manage the operation of the selected mode during the TV call.

9. The mobile communication apparatus of claim 5 further comprising a set of user controls, wherein the operating mode manager is configured to change the selected mode according to an operation of the set of user controls.

10. The mobile communication apparatus of claim 5, wherein the temperature estimator is configured to have the operating mode manager change the selected mode from the first mode to the second mode if the estimation reaches a predetermined mode-changing value lower than the threshold.

11. A mobile communication apparatus having and being configured in a housing, comprising:

a first camera;

a second camera;

a first power controller configured to turn on and to turn off power supplied to the first camera;

a second power controller configured to turn on and to turn off power supplied to the second camera;

a radio circuit configured to send and receive a plurality of signals for a TV call;

an operating mode manager coupled to the first power controller, the second power controller and the radio circuit, the operating mode manager being configured, during the TV call, to manage an operation of a mode selected out of a plurality of modes including a first mode and a second mode, each of the modes being a combination of whether the first power controller turns on power supplied to the first camera and whether the second power controller turns on power supplied to the second camera;

a memory configured to store a plurality of data of each of the modes regarding a relation between a period of time of operation and a value of housing temperature; and a temperature estimator coupled to the operating mode manager and the memory, the temperature estimator being configured to measure a period of time of the selected mode, and if the selected mode is changed from the first mode to the second mode, to estimate a first value of housing temperature corresponding to the period of time of operation of the first mode based on the data of the first mode read out of the memory, to estimate a second value of housing temperature corresponding to the period of time of operation of the second mode based on the data of the second mode read out of the memory, and to have the operating mode manager stop the operation of the selected mode if an estimation based on the first value and the second value reaches a predetermined threshold.

12. The mobile communication apparatus of claim 11 further comprising a set of user controls, wherein the operating mode manager is configured to change the selected mode according to an operation of the set of user controls.

13. The mobile communication apparatus of claim 11, wherein the temperature estimator is configured to have the operating mode manager change the selected mode from the first mode to the second mode if the estimation reaches a predetermined mode-changing value lower than the threshold.

* * * * *